United States Patent [19]
Ichiyama

[11] Patent Number: 5,658,080
[45] Date of Patent: Aug. 19, 1997

[54] MOTOR WITH A HYDRO-DYNAMIC BEARING

[75] Inventor: Yoshikazu Ichiyama, Kyoto, Japan

[73] Assignee: Nidec Corporation, Kyoto, Japan

[21] Appl. No.: 565,688

[22] Filed: Dec. 1, 1995

[30] Foreign Application Priority Data

Dec. 16, 1994 [JP] Japan ................................. 6-334040
Feb. 27, 1995 [JP] Japan ................................. 7-064811

[51] Int. Cl.$^6$ ............................. F16C 32/06; F16C 33/82
[52] U.S. Cl. ......................... 384/112; 384/119; 384/132
[58] Field of Search ............................. 384/100, 107, 384/112, 119, 132

[56] References Cited

U.S. PATENT DOCUMENTS

| | | | |
|---|---|---|---|
| 3,778,123 | 12/1973 | Hendler et al. | 384/132 |
| 4,445,793 | 5/1984 | Shinohara | 384/130 |
| 4,892,418 | 1/1990 | Asada et al. | 384/112 X |
| 5,112,142 | 5/1992 | Titcomb et al. | 384/132 X |
| 5,246,294 | 9/1993 | Pan | 384/119 |
| 5,427,456 | 6/1995 | Hansel | 384/112 |
| 5,433,529 | 7/1995 | Hensel | 384/119 X |

FOREIGN PATENT DOCUMENTS

50-45147  4/1975  Japan .

*Primary Examiner*—Thomas R. Hannon
*Attorney, Agent, or Firm*—McCormick, Paulding & Huber

[57] ABSTRACT

A motor includes a shaft; a shaft retainer which retains the shaft and a thrust plate provided to the shaft, and thrust dynamic pressure fluid bearing means are provided between the thrust plate and the shaft retainer and radial dynamic pressure fluid bearing means are provided between the shaft retainer and the shaft. Between the outer circumferential surface of the thrust plate and the inner circumferential surface of the shaft retainer, a ring-shaped space is formed and oil is filled in a part of this ring-shaped space. Ring-shaped projections are provided on the outer circumferential surface of the thrust plate. When the motor is running at a high-speed, oil in the ring-shaped space is retained on the shaft retainer and through this oil, oil in the thrust dynamic pressure fluid bearings at the upper and lower surface sides are communicated with each other.

21 Claims, 4 Drawing Sheets

MOTOR WITH A HYDRO-DYNAMIC BEARING

BACKGROUND OF THE INVENTION

1. Field of the Invention

The present invention relates to a motor and, more particularly, to a motor having hydro-dynamic bearings (dynamic pressure fluid bearings).

2. Description of the Related Art

Figure 1:
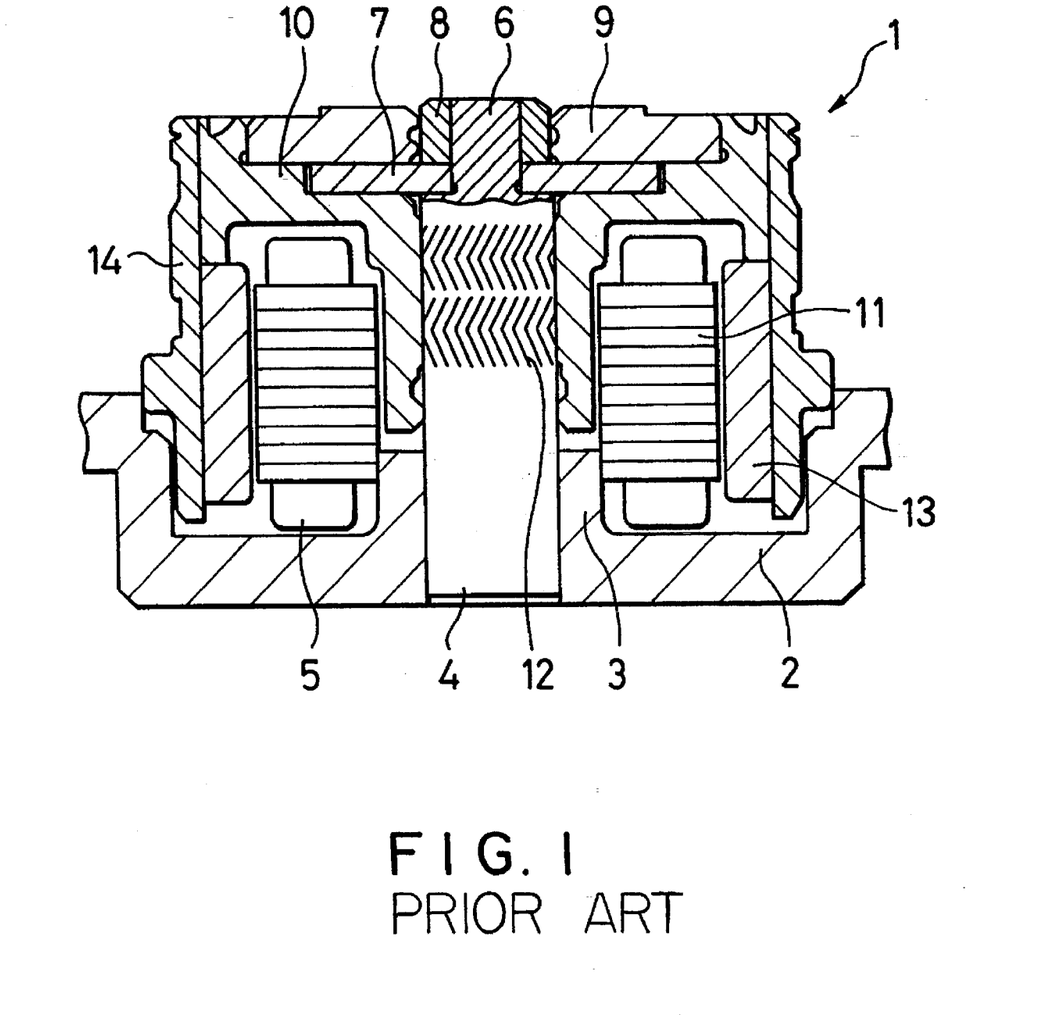
FIG. 1 is a sectional view showing an example of a known motor.

A spindle motor using, for instance, hydro-dynamic bearings as shown in FIG. 1 has been so far known to experts. In case of a known spindle motor 1 using dynamic pressure fluid bearings as shown in FIG. 1, the lower end of a shaft 4 is fixed to a boss 3 of a stationary base 2 and further, a stator 5 is fixed to the radial outward portion of this boss 3. A small diameter portion 6 is provided on the top of the shaft 4. A thrust plate 7 is fitted to this small diameter portion 6. A bush 8, which is also fitted to the small diameter portion 6, is retained on the top of this thrust plate 7. A cover plate 9 is provided on the upper surface of the thrust plate 7 in the radial outward direction of the bush 8. A sleeve 10 is provided at the radial outward portion of the cover plate 9 and the cover plate 9 and the sleeve 10 are mutually fixed, forming a shaft retainer.

Further, a part of the sleeve 10 retains the thrust plate 7 and is extending downward of the thrust plate 7. A sleeve 10 supports a radial hydro-dynamic bearing 12 which is formed at the middle of the shaft 4. Further, the sleeve 10 supports a rotor magneto 13 at a position opposite to the stator 5 of the radial outward portion of the stator 5. Furthermore, the sleeve 10 has a hub 14 at the radial outward portion. This hub 14 retains a magnetic disk (not shown). Oil is filled between the upper surface of the thrust plate 7 and the lower surface of the cover plate 9 and between the lower surface of the thrust plate 7 and the sleeve 10, forming a thrust hydro-dynamic bearing. Oil is also filled between the shaft 4 and the sleeve 10, forming a radial hydro-dynamic bearing.

In case of such a spindle motor, if the oil is filled in whole area of the thrust and radial hydro-dynamic bearings, the following drawback arises. When bubbles are included in the oil during the oil injection thereof or rotating period of the motor, the bubbles am difficult to be exhausted. Therefore, the bubbles are held in the oil. If the oil includes the bubbles, when atmosphere temperature increases or atmosphere pressure decreases, the bubbles expand, thereby leaking the oil from the thrust and the radial hydro-dynamic bearing, resulting in the shortage of the oil in the hydro-dynamic bearings. To solve the drawback, it is possible to provide a space connected to the atmosphere between the outer surface of the thrust plate 7 and the sleeve 10. However, in this case, oil in the thrust hydro- dynamic bearing flows in the radial outward direction and spreads into the atmosphere by the centrifugal force when the motor rotates, resulting in shortage of the oil. If the oil in the thrust hydro-dynamic bearing becomes short, the thrust plate 7 and the sleeve 10, and/or the cover plate 9 cause a metallic contact and a seizure may be caused in the hydro-dynamic bearing. Further, this type of motor has no reservoir for retaining surplus oil, i.e., a so-called oil reservoir. It is therefore necessary to strictly measure oil quantity present in the bearing portion and if oil quantity is much more than a specified volume, surplus oil may possibly leak to the outside from the bearing portion. Further, as it is not possible to reserve surplus oil in advance, if the hydro-dynamic bearing is used for a long period of time, oil evaporates and in such a case, the oil in the hydro-dynamic bearing portion decreases, and the bearing life may become short.

SUMMARY OF THE INVENTION

Accordingly, it is an object of the present invention to provide a motor equipped with a hydro-dynamic bearings which is capable of solving the problems described above and preventing the seizure of the bearing due to oil shortage.

In case of a motor of the present invention, a ring-shaped space is provided between the outer circumferential surface of the thrust plate and the inner circumferential surface of the shaft retainer. Surplus oil is reserved in a part of this ring-shaped space. On the outer circumferential surface of the thrust plate, ring-shaped projections are provided projecting into the ring-shaped space and communication holes are provided in the thrust plate to communicate the ring-shaped space with atmosphere externally of the shaft retainer. When the motor is not running, the oil in the ring-shaped space is collected in its lower part. When the motor is running at a high speed, the oil is retained on the inner circumferential surface of the shaft retainer. Through this oil retained on the inner circumferential surface, the oil in the thrust hydro- dynamic bearing at an upper surface of the thrust plate becomes continuous with the oil in a thrust hydro-dynamic bearing at a lower surface of the thrust plate.

In the case of a motor of the present invention, surplus oil is reserved in a part of the ring-shaped space provided between the outer circumferential surface of the thrust plate and the inner circumferential surface of the shaft retainer. Accordingly, a part of the ring-shaped space is used as a reservoir of surplus oil and the remainder of the ring-shaped space is used as an air chamber. This air chamber is connected to the atmosphere via the communication holes and if the air in the air chamber is expanded by temperature change, the expanded air is discharged to the atmosphere through the communication holes. Further, as the ring-shaped projections are provided on the outer circumferential surface of the thrust plate, the oil in the thrust hydro-dynamic bearings at the upper and lower surfaces of the thrust plate become continuous by way of the oil adhered to the inner circumferential surface of the shaft retainer by the centrifugal force when the motor is running at a high speed. Therefore, the centrifugal force acting on the oil retained on the inner circumferential surface of the shaft retainer is balanced with the centrifugal force acting on the oil in the thrust hydro- dynamic bearings and thus, the oil in the thrust hydro-dynamic bearings is prevented from flowing in the radial outward direction by the centrifugal force, preventing oil shortage caused in the thrust hydro-dynamic bearings.

DETAILED DESCRIPTION OF THE PREFERRED EMBODIMENT

First Embodiment

Figure 2:
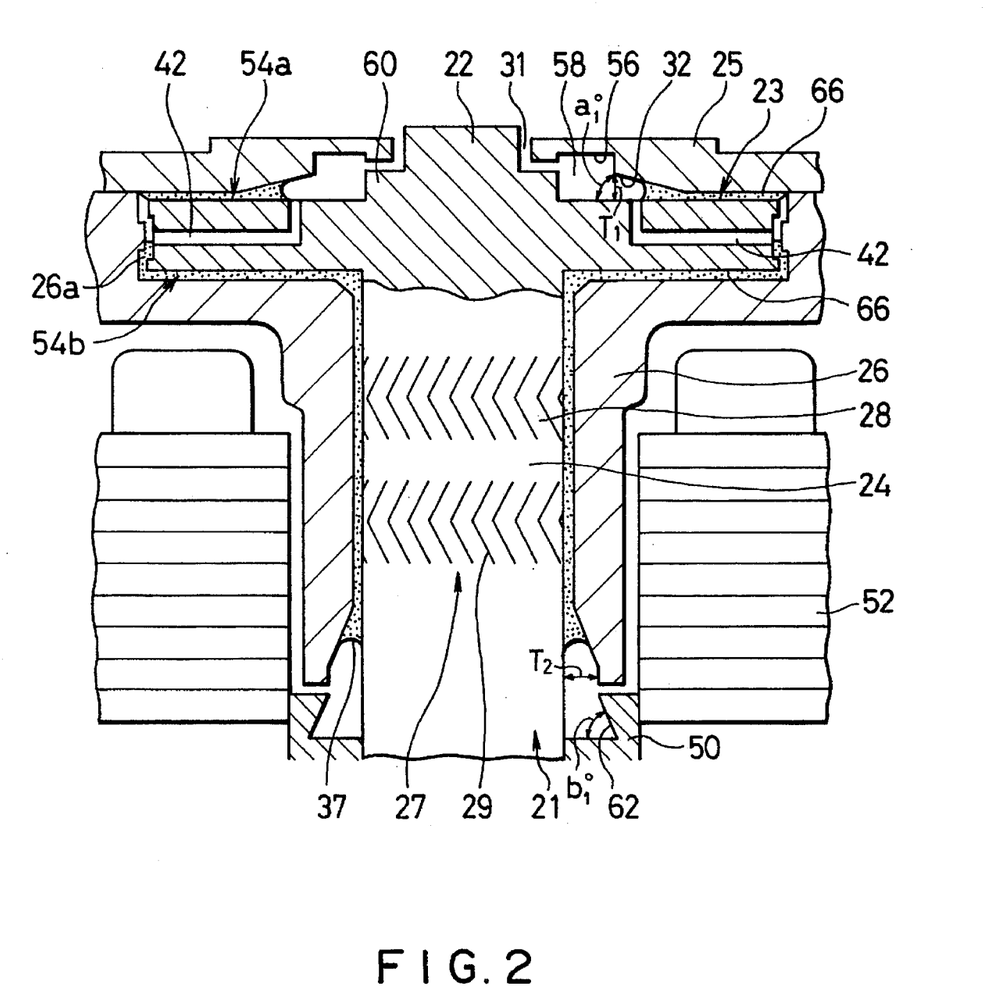
FIG. 2 is a sectional view of principal parts of a motor in the first embodiment of the present invention.

The basic structure of the first embodiment is same as the structure shown in FIG. 1. The FIG. 2 shows principal parts of the motor in the first embodiment of the present invention. In FIG. 2, a motor as shown has been provided with a stationary shaft 21, of which lower part has been fixed to a boss (not shown) of the stationary base. A disc-shaped thrust plate 23, having upper and lower side surfaces and a circumferential surface, has been provided on the top of this shaft 21 in one united body. The outer diameter of the lower part of the shaft 21 below the thrust plate 23, i.e., the outer diameter of the first portion 24 is relatively large. The outer diameter of the upper part of the shaft 21 above the thrust plate 23, i.e., the second portion 22 is relatively small as about ½ of the outer diameter of the first portion 24. At the radial outward portion of the second portion 22 of the shaft 21, a cover plate 25 is provided above the thrust plate 23. A rotor member is mounted to this cover plate 25. In this embodiment, the cover plate 25 and the rotor member are fixed to each other, forming the shaft retainer. A part of the rotor member defines an axially extending portion which retains the outer circumferential surface of the thrust plate 23 and cooperates with the thrust plate 23 to form a ring-shaped space therebetween. A part of the rotor member further includes a radially extending portion opposing the lower surface of the thrust plate 23, and a sleeve 26 extending downwardly therefrom. The sleeve 26 supports a radial hydro-dynamic bearing 27 provided at the middle of the shaft 21. A first continuous gap is formed between the cover plate and the thrust plate 23, and a second continuous gap includes a cylindrical gap formed between the thrust plate and the axially extending portion and the gap between the thrust plate and the radially extending portion and the ring-shaped space. The first and second gaps are continuous with each other.

The radial hydro-dynamic bearing 27 is comprised of a pair of radial-bearing grooves 28, 29 formed on the shaft 21 with a space in the axial direction. These radial bearing grooves may be formed on the inner circumferential surface of the sleeve 26 instead of the shaft 21. The shaft 21 is retained by a stationary base. A stator 52 is fixed to a boss 50 of the stationary base. At the radial outward portion of the stator 52, the sleeve 26 supports rotor magnets (not shown) at the position opposite to the stator 52. Further, the sleeve 26 has a hub (not shown) at the radial outward portion and magnetic disks (not shown) are retained by this hub. Thrust hydro-dynamic pressure fluid bearings 54a, 54b are provided between the thrust plate 23 and shaft retaining members (the cover plate 25 and the sleeve 26) surrounding the upper and lower surfaces of the thrust plate 23, and the radial hydro-dynamic bearing 27 is provided between the shaft 21 and the sleeve 26.

In this embodiment, the thrust hydro-dynamic bearings 54a, 54b are comprised of bearing grooves formed on the upper and lower surfaces of the thrust plate 23. These bearing grooves of the thrust hydro-dynamic bearings 54a, 54b may be formed on the cover plate 25 and/or the radially extending portion of the rotor member instead of the thrust plate 23.

The detailed structure of the radial hydro-dynamic bearing 27 and the thrust dynamic pressure fluid bearings 54a, 54b will be described below. An air passage 31 which is communicated with the atmospheric air is formed between the radially inner part of the cover plate 25 and the second portion 22 of the shaft 21. At the lower surface of the radial inner portion of the cover plate 25, a tapered or slant portion 32, serving as a first surface tension sealing means as shown in FIG. 2, is tilted upward at a prescribed angle (a1 degree) in the radial inner direction. A concave portion 56 is provided beside the tapered portion 32. The concave portion 56 forms a first space 58 jointly with the upper surface of the thrust plate 23. It is desirable that the space 58 has a relative large capacity to release the pressure of air passed through the communication holes 42 which each includes one end opening directly into the tapered space. A shoulder portion 60 in somewhat large diameter is formed provided at the base of the small diameter portion 22 of the shaft 21 and a space between this shoulder portion 60 and the inner diameter end of the cover plate 25 is set in a small size. Accordingly, a tapered sealing member comprising a tapered portion 32 has been provided at the outside of the thrust hydro-dynamic bearing 54a provided on the upper surface of the thrust plate 23, a narrowed sealing member comprising the shoulder portion 60 and the cover plate 25 is arranged at the outside of this tapered sealing member, and the space 58 is arranged between a pair of these sealing members. Further, it is desirable that the angle a1 of the tapered portion 32 is 5 to 15 degrees.

At the lower portion of the sleeve 26 facing the shaft 21, a tapered portion 37, which serves as a second surface tension sealing means as shown in FIG. 2, which is inclined at a specified angle (b1 degree) at the radial outward portion toward the lower part of the shaft 21. Further, a space between the lower end of the sleeve 26 and the upper end of the boss 50 is set at a small distance and thus, the narrowed region functions as a narrowed sealing member. Further, a ring-shaped concave portion 62 is provided on the inner circumference of the boss 50 and the inner circumferential surface of this concave portion 62 has been widened downward to the radial outward portion. It is desirable that this concave portion 62 functions as a second space jointly with the shaft 21 to accomodate oil dropped from the tapered portion 37 and therefore, it has a relatively large capacity. Further, the angle b1 of the tapered portion 37 is desirable to be 5 to 15 degrees.

As shown in FIG. 2, oil is filled in a space from the thrust dynamic pressure fluid bearings 54a, 54b to the radial hydro-dynamic bearing 27, i.e., a space formed from the upper, circumferential side and lower surfaces of the thrust plate 23 to the lower end of the shaft 21 (the circumferential side surface of the thrust plate 23 will be described later). In this embodiment, to prevent oil leakage from these hydro-dynamic bearings 27 and 54a, 54b, the maximum spaces between the tapered portions 32 and 37 have been set larger than that between the shaft 21 and the shaft retainer. Thus, it becomes difficult for oil to leak from the tapered portions 32 and 37.

In connection with the thrust plate 23, the motor is further constructed as follows. When referred to FIGS. 2 and 3, the outer circumferential surface of the thrust plate 23 is circular and the inner circumferential surface of the region 26a of the axially extending portion of the rotor member to accept the thrust plate 23 is also circular, and the ring-shaped space 64 has been formed between the thrust plate 23 and the region 26a. When referred to FIG. 2, the oil 66 is contained in a part of this ring-shaped space 64 or second gap. Quantity of this oil 66 is desirable to be about ½ of the ring-shaped space 64 and if quantity of oil 66 increased, the communication hole, which will be described later, is blocked up by the oil 66, while the oil layer connecting the thrust hydro-dynamic bearings 54a and 54b at the high-speed rotation will not be formed if quantity of oil 66 decreased.

A pair of communication holes 42 have been substantially formed on the thrust plate 23 at a space of 180 degrees or diametrically opposite to one another. One end of the communication hole 42 opens to the outer circumferential surface of the thrust plate 23, i.e., the ring-shaped space 64 and the other end opens on the top surface of the thrust plate 23 at the first gap. In the embodiment, as clearly shown in FIG. 2, one end opening of the communication holes 42 opens at the axial center of the thrust plate 23 and the other end opening opens at the tapered part 32. Even if the oil 66 is fed through the communication hole 42, the air and oil 66 are separated in the tapered portion 32 and the following first oil space 58 and the oil 66 is returned to the thrust hydro-dynamic bearing 54a and the air is discharged to the outside of the motor through the air passage 31 which opens to atmosphere.

Figure 3:
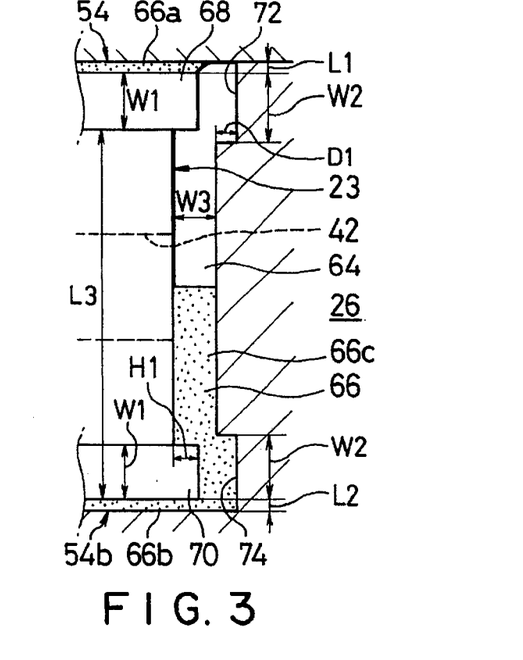
FIG. 3 is an enlarged partial sectional view of a thrust plate and its vicinity of the motor shown in FIG. 2.

The circumferential surface of the thrust plate 23 has been further provided with ring-shaped projections 68 and 70 at both ends, projecting in the radial outward direction. In addition, corresponding to and confronting the ring-shaped projections 68 and 70, a pair of ring-shaped concaves or recesses 72 and 74 have been provided at a prescribed space on the inner circumferential surface of the region 26a. To obtain the effect of operation described later, it is possible to set, for instance, dimensions relative to the thrust plate 23 and the like as follows.

Space L1 between the top surface of the thrust plate 23 and the cover plate 25: about 0.01 mm Space L2 between the lower surface of the thrust plate 23 and the radially extending portion of the rotor member; about 0.01 mm     Thickness (axial length) L3 of the thrust plate 23: about 1.4 mm     Width W1 of the ring-shaped projections 68 and 70: about 0.2 mm     Height H1 of the ring-shaped projections 68 and 70: about 0.1 mm     Width W2 of the ring-shaped concave 72 and 74: about 0.22 mm     Depth D1 of the ring-shaped concave 72 and 74: about 0.1 mm     Width W3 of the ring-shaped space 64: about 0.15 mm     Then, the operating effects of the motor described above will be explained.

While the motor is not running, the oil 66 is retained in the state as shown in FIG. 3. That is, the oil 66 is collected at the bottom of the ring-shaped space 64 of the second gap for its empty weight, and the oil 66b of the second gap in the thrust hydro-dynamic bearing 54b at the lower surface side of the thrust plate 23 will become continuous with the oil 66c contained in the ring-shaped space 64 of the second gap, while the oil 66c of the second gap and the oil 66a of the first gap in the thrust hydro-dynamic bearing 54a at the top surface side of the thrust plate 23 are kept in the separated or discontinuous state by the air chamber. Further, the opening at one end of the communication hole 42 located between the ring-shaped projections 68 and 70 is at least partially positioned above the oil 66c in the ring-shaped space 64 and communicates with the air chamber of the ring-shaped space 64. Accordingly, even when the air in the air chamber is expanded by temperature change and the like, the expanded air is discharged to atmosphere externally of the motor through the communication hole 42, the first space 58 and the air passage 31, the adverse effect of the expansion of air is thus prevented.

Figure 4:
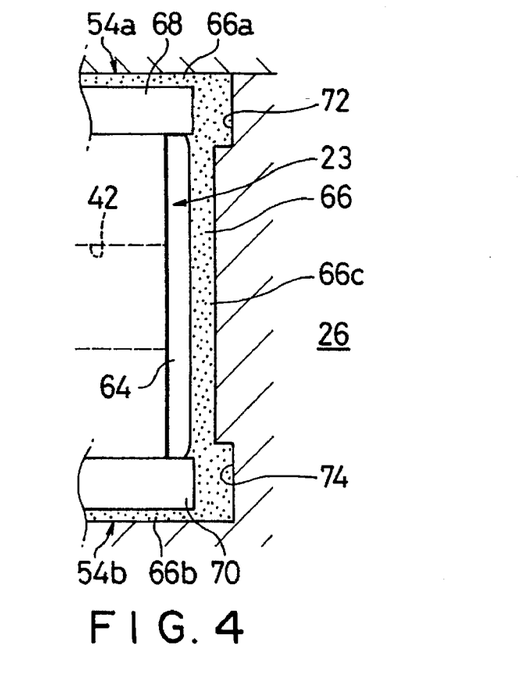
FIG. 4 is an enlarged partial sectional view corresponding to FIG. 3, showing the status of oil when a motor shown in FIG. 2 is running at a high speed.

On the other hand, while the motor is running at a high-speed, the oil 66 is kept in the state as shown in FIG. 4. That is, the centrifugal force produced by the high-speed rotation of the rotor member acts on the oil 66a,66b in the thrust dynamic pressure fluid bearings 54a, 54b and the oil 66c in the ring-shaped space 64 is kept in the state wherein it is adhered to the inner circumferential surface of the axially extending portion, while the oil 66a, 66b in the thrust dynamic pressure fluid bearings 54a, 54b at the upper and lower surface sides of the thrust plate 23 tends to flow in the radial outward direction. Therefore, as shown in FIG. 4, the oil 66a, 66b in the thrust hydro-dynamic bearings 54a, 54b flows in the radial outward direction to the layer of oil 66c held on the inner circumferential surface of the axially extending portion of the rotor member, and the oil 66a of the first gap in the thrust hydro-dynamic bearing 54a at the top surface becomes continuous with the oil 66b of the second gap in the thrust hydro-dynamic bearing 54b at the lower surface side by way of the oil 66c of the second gap adhered on the inner circumferential surface of the axially extending portion of the rotor member. In this continuous state, the oil 66c retained on the axially extending portion of the rotor member rotates at a high speed jointly with the rotor member and therefore, a relatively large centrifugal force will act thereon. On the other hand, the centrifugal force acting on the oil 66a, 66b in the thrust hydro-dynamic bearings 54a, 54b at the upper and lower sides is supported on the inner circumferential surface of the axially extending portion of the rotor member and is balanced with the centrifugal force acting on the oil 66c adhered on this inner circumferential surface. Thus, the oil 66a, 66b in the thrust hydro-dynamic bearings 54a, 54b is suppressed to flow in the radial outward direction, preventing oil shortage at the high-speed rotation of the motor. In particular, as the ring-shaped projections 68 and 70 have been provided at both ends of the thrust plate 23, the ends of the ring-shaped projections 68 and 70 extend to the layer of the oil 66c retained on the axially extending portion of the rotor member and the continuous state of the oil 66a, 66b in the thrust hydro-dynamic bearings 54a, 54b and the oil 66c retained on the inner circumferential surface of the axially extending portion is kept maintained. As the oil 66 is kept adhered on the inner circumferential surface of the axially extending portion even when the motor is running at a high-speed, a gap is formed between the circumferential surface of the thrust plate 23 and the axially extending portion of the rotor member such that the opening of one end of the communication hole 42 is communicated with the air chamber of the ring-shaped space 64 and the communicating state between the air chamber and the motor is maintained as shown in FIG. 4.

One embodiment of the motor involved in the present invention has been described above. The present invention is not limited to such an embodiment but various modifications and/or corrections may be made without departing from the spirit and scope thereof.

For instance, in the embodiment as illustrated in the figures, two communication holes 42 have been provided on the thrust plate 23 but, for instance, one or more than three communication holes 42 may be provided.

Further, in the embodiment as illustrated in the figures, a pair of the ring-shaped concaves or recesses 72 and 74 have been provided on the inner circumferential surface of the axially extending portion of the rotor member corresponding and confronting to the ring-shaped projections 68 and 70 of the thrust plate 23. In order to facilitate the oil pouring as well as to reduce loss of oil when the motor is running, it is convenient to provide these ring-shaped concaves leaving some space and if it is not so necessary to consider them, the ring-shaped concaves 72 and 74 may be omitted.

In case of the motor in the construction as described above, surplus oil 66 is contained in a part of the ring-shaped space 64 provided between the outer circumferential surface of the thrust plate 23 and the inner circumferential surface of the shaft retainer. Therefore, a part of the ring-shaped space 64 serves as a reservoir of the surplus oil 66 and the remainder of the ring-shaped space 64 acts as an air chamber, which communicates with the atmosphere via the communication holes 42 and if the air in the air chamber expands by temperature change, the expanded air is discharged to the atmosphere through the communication holes 42. Further, as the ring-shaped projections 68 and 70 have been provided on the outer circumferential surface of the thrust plate 23, the oil 66a and 66b in the thrust hydro-dynamic bearings 54a, 54b at the upper and lower surface sides of the thrust plate 23 become the continuous with each other by these projections 68 and 70 through the oil 66c which was adhered to the inner circumferential surface of the shaft retainer by the centrifugal force at the high-speed rotation of the motor. Accordingly, the centrifugal force acting on the oil 66c retained on the inner circumferential surface of the shaft retainer is balanced with the component of centrifugal force acting on the oil 66a, 66b in the thrust hydro-dynamic bearings 54a, 54b, preventing the oil 66a, 66b in the thrust hydro-dynamic bearings 54a, 54b from flowing in the radial outward direction and oil shortage in the thrust hydro-dynamic bearings 54a, 54b.

Second Embodiment

Figure 5:
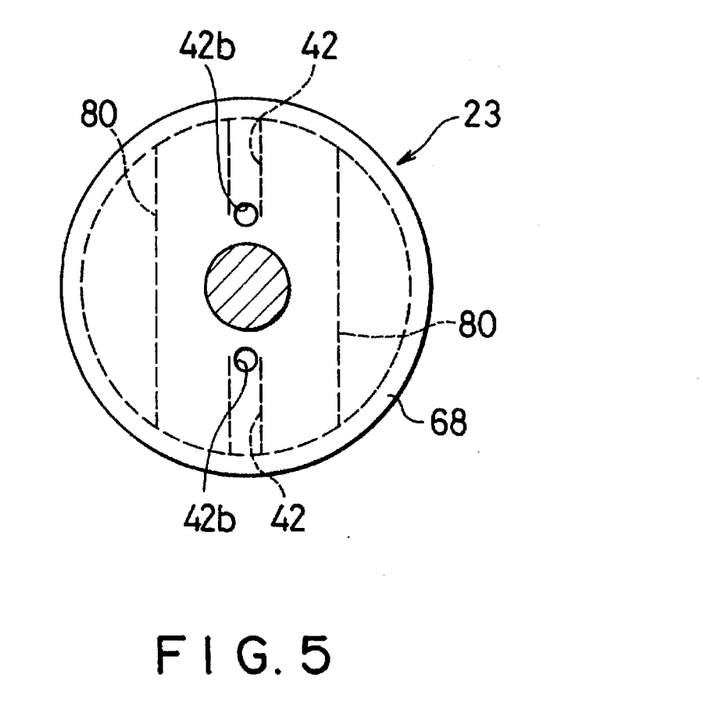
FIG. 5 is a plane view showing the thrust plate of the motor in the second embodiment of the present invention.
Figure 6:
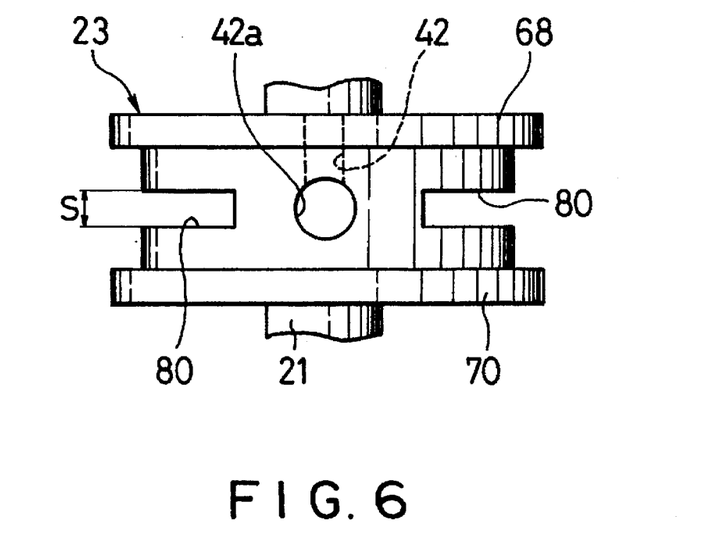
FIG. 6 is a front view of the thrust place in the second embodiment.

The second embodiment of the present invention will be described in the following. The basic construction of the motor in the second embodiment is identical to that of the motor in the first embodiment. However, the thrust plate 23 is provided with recesses having first and second portions such as oil containing notches 80. As shown in FIG. 5 and 6, the oil containing notches 80 have been diametrically oppositely arranged or provided substantially with a space of 180 degrees between a pair of the communication holes 42 provided diametrically opposite to one another and opens to the ring-shaped space 64. It is desirable that each oil containing notch 80 is provided between a pair of the ring-shaped projections (will be described later) of the thrust plate 23 and its width S is set smaller than the clearances T1, T2 of the open ends of the tapered portions 32 and 37 so that the oil 66 is maintained in the notch 80 as required. Each oil containing notch 80 extends inward along the edge surface of the thrust plate 23 and its lower surface extends substantially in parallel with the radial portion (the portion extending in the radial direction) of the communication holes 42. It is desirable that each oil containing notch 80 has a relatively large capacity and therefore, its lower surface is closed to the communication holes 42 and its width is made relatively wide. The oil 66 will be contained in each oil containing notch 80 up to about ½ of its capacity.

Then, the action and effect of the motor described above will be explained.

When the motor is not running, the oil 66 is kept in the state shown in FIG. 2 as described above. At this time, the oil 66 is sucked in each notch 80 of the thrust plate 23 by the capillarity as the clearance between the upper and lower surfaces of the thrust plate 23 is sufficiently narrow and each notch 80 serves as an oil reservoir.

On the other hand, when the motor is running at a high-speed, the oil 66 is kept in the state shown in FIG. 4 as described above. At this time, oil in each notch 80 is drawn out of the notch 80 in the state continuous with the oil 66c and is adhered to the inner circumferential surface of the axially extending portion of the rotor member jointly with the oil 66c.

The component of centrifugal force supporting the flow of the oil 66a, 66b in the upper and lower thrust hydro-dynamic bearing is equivalent to the accumulated centrifugal force acting on the oil present in the inside of a line connecting the ring-shaped projections 68 and 70 at both ends of the thrust plate 23. Therefore, if oil quantity present in the inside of the line connecting the ring-shaped projections 68 and 70 increases, the stability of this structure will increase accordingly. Such data as W3, H1, L1, etc. have been designed so as to store much oil within a range not to obstruct the oil sealing at the upper and lower open ends for stabilizing operation. The oil stored in each notch 80 is for increasing oil to be contained for attributing to stabilization of the operation as described above. When the motor is kept stationary, oil is sucked into each notch 80 by the capillarity and when the motor is running, oil is drawn out following the oil 66c moving to the inner circumferential surface of the axially extending portion of the rotor member by the centrifugal force, thereby fully performing its role.

In the second embodiment, two notches 80 have been provided. However, it is not limited to this but one or more notches may be provided to run around the thrust plate.

As described above, in the second embodiment of the motor of the present invention embodiment, surplus oil 66 is contained in the ring-shaped space 64 provided between the outer circumferential surface of the thrust plate 23 and the inner circumferential surface of the shaft retainer and a part of each notch 80 of the thrust plate 23. Therefore, a part of the ring- shaped space 64 and each notch 80 function as a reservoir of surplus oil 66 and the remainder of them function as an air chamber. This air chamber communicates with the atmosphere via the communication holes 42 and if the air in the air chamber is expanded due to temperature change, the expanded air is discharged to the atmosphere externally of the shaft through the communication holes 42. Further, the oil 66a, 66b in the thrust hydro-dynamic bearings 54a, 54b at the upper and lower surface side of the thrust plate 23, which has been adhered to the inner circumferential surface of the shaft retainer via the oil 66c by the centrifugal force when the motor is running at a high-speed will become the continuous among each other. Accordingly, the centrifugal force acting on the oil 66c kept adhered to the inner circumferential surface of the shaft retainer is balanced with the centrifugal force acting on the oil 66a, 66b in the thrust hydro-dynamic bearings 54a, 54b and the oil 66a, 66b in the thrust hydro-dynamic bearings 54a, 54b are prevented from flowing in the radial outward direction and oil shortage in the thrust hydro-dynamic bearings 54a, 54b is prevented. Further, as the oil 66 is contained in the ring- shaped space 64 and each notch 80 of the thrust plate 23, surplus oil quantity increases and thus, the layer of oil 66c retained in the shaft retainer becomes thick, making the oil layer able to sufficiently withstand a large centrifugal force.

What is claimed is:

1. A motor comprising a stationary shaft, a rotor member rotatably coupled with said stationary shaft by dynamic fluid pressure bearing, a disc-shaped thrust plate fixed to the stationary shaft and having upper and lower surfaces and a circumferential surface, said rotor member including a sleeve portion surrounding said stationary shaft with a cylindrical gap therebetween, a radially extending portion with a surface opposing said lower surface of the thrust plate with a gap therebetween, and an axially extending outer portion confronting the circumferential surface of the thrust plate, and a cover plate enclosing said thrust plate in cooperation with said rotor member with a continuous gap between the thrust plate and other two cooperating members, wherein the thrust plate and the rotor member are formed and arranged such that a ring-shaped space is formed between the circumferential surface of the thrust plate and the axially extending outer portion of the rotor member, and oil resides in the cylindrical and continuous gap in such a manner that the oil resides at a first gap between the thrust plate and cover plate and at a second continuous gap including the cylindrical gap and the gap between the thrust plate and the radially extending portion of the rotor member and the ring-shaped space, the first and second gaps being continuous with each other, with the oil at the ring-shaped space being discontinuous with the oil at the first gap while the motor is at rest and the oil at the first gap being continuous with the oil in the second gap when the motor is running.

2. A motor as claimed in claim 1, wherein the circumferential surface of the thrust plate is formed with ring-shaped projections which project into the ring-shaped space.

3. A motor as claimed in claim 2, wherein the ring-shaped projections are formed at the upper and lower ends of the circumferential surface of the thrust plate, and the axially extending outer portion of the rotor member is formed with a pair of ring-shaped recesses to form a specified space with the ring-shaped projections.

4. A motor as claimed in claim 3, wherein the cover plate is arranged to leave an air passage to atmosphere between the cover plate and the stationary shaft, and wherein the thrust plate is formed with at least one communication hole connecting the ring-shaped space and the air passage.

5. A motor as claimed in claim 4, wherein one end of the communication hole opens to the ring-shaped space between the ring-shaped projections of the thrust plate, the oil in the second continuous gap resides in such a manner that the upper level of the oil in the ring-shaped space leaves the end of the communication hole open while the motor is at rest, and that the oil in the ring-shaped space adheres to the surface of axially extending portion of the rotor member which confronts the circumferential surface of the thrust plate, leaving a gap between the circumferential surface and the oil while the motor is running.

6. A motor as claimed in claim 4, wherein the oil is filled in the second gap such that the upper level of the oil in the ring-shaped space is at nearly half of the height of the ring-shaped space.

7. A motor as claimed in claim 1, wherein the cover plate is formed with a slant portion at the surface opposing the thrust plate to form a tapered space between the cover plate and the thrust plate for surface tension sealing.

8. A motor as claimed in claim 7, wherein the other end of the communication hole opens at the tapered space.

9. A motor as claimed in claim 1, wherein surface tension sealing is provided at the end of the sleeve portion of the rotor member which end is opposite from the thrust plate.

10. A motor comprising a shaft, a disc-shaped thrust plate fixed to the shaft, a shaft retainer for confining the shaft and thrust plate within the retainer, the retainer having inner surfaces confronting the shaft and thrust plate leaving a continuous gap between the retainer and shaft, and between the retainer and the thrust plate, oil residing in the gap, thrust dynamic pressure fluid bearing means provided between the thrust plate and the shaft retainer, and radial dynamic pressure fluid bearing means provided between the shaft and the shaft retainer, and wherein a ring-shaped space is formed between the circumferential surface of the disc-shaped thrust plate and a portion of the inner surface of the shaft retainer that opposes the circumferential surface, the ring-shaped space serving as a reservoir for the oil, the thrust plate is provided with communication holes for connecting the ring-shaped space with atmosphere, and the oil resides in the reservoir such that the level of the oil is at a height leaving the communication hole open to the ring-shaped space when the motor is at rest, and that the oil adhering to the portion of the inner surface of the retainer produces a space between the oil and the circumferential surface of the thrust plate while the motor is running.

11. A motor as claimed in claim 10, wherein the thrust plate is formed with a pair of ring-shaped projections on its circumferential surface at both ends thereof, and the communication hole opens to the ring-shaped space between the ring-shaped projections.

12. A motor as claimed in claim 11, wherein a portion of the shaft retainer is formed with a pair of ring-shaped recesses at a position opposite to the ring-shaped projections of the thrust plate with a given space being formed from the ring-shaped projections.

13. A motor comprising a shaft, a disc-shaped thrust plate fixed to the shaft, a shaft retainer for enclosing and retaining the shaft and thrust plate within the retainer with continuous gaps being formed between the shaft retainer and the shaft, and between the shaft retainer and the thrust plate, a thrust dynamic pressure fluid bearing provided between the thrust plate and the shaft retainer, and a radial dynamic pressure fluid bearing provided between the shaft retainer and the shaft, and wherein the gap between the thrust plate and the shaft retainer includes a first gap formed between one side surface of the thrust plate and the shaft retainer and a second gap formed between the other side surface of the thrust plate, a ring-shaped space being formed between the circumferential surface of the disc-shaped thrust plate and a portion of the shaft retainer confronting the circumferential surface, the ring-shaped space being continuous with the first and second gaps, the thrust plate being formed with a communication hole for connecting the ring-shaped space with atmosphere externally of the shaft retainer and a recess formed between the side surface of the thrust plate and retracting radially from the circumferential surface of the thrust plate, with the recess being open to the ring-shaped space such that the recess serves as an oil reservoir together with the ring-shaped space, oil provided in the gap between the shaft and the shaft retainer, in the first and second gaps and the ring-shaped space such that the oil is discontinuous at the ring-shaped space while the motor is at rest, and that the oil in the first gap is continuous with the oil in the second gap through the oil in the ring-shaped space when the motor is running.

14. A motor as claimed in claim 13, wherein a pair of ring-shaped projections are formed on the circumferential surface of the thrust plate at both edges of the circumferential surface, and the portion of the shaft retainer that confronts the circumferential surface is formed with a pair of ring-shaped recesses at the positions confronting the pair of ring-shaped projections.

15. A motor as claimed in claim 14, wherein the thrust plate is formed with a pair of communication holes with their one end open at the circumferential surface of the thrust plate and the other end open at one side surface of the thrust plate.

16. A motor as claimed in claim 15, wherein the pair of communication holes is formed to be diametrically opposite to each other, and recesses are formed in the thrust plate including first and second portions diametrically oppositely arranged between the pair of communication holes, the recesses being formed between the pair of ring-shaped projections, and the oil residing in the ring-shaped space and the recesses up to the level of nearly half of the height of the ring-shaped space and the recesses.

17. A motor as claimed in claim 16, wherein the first and second portions of the recesses extend radially inwardly of the thrust plate from the circumferential surface.

18. A motor as claimed in claim 13, wherein a first surface tension sealing means is provided at the first gap.

19. A motor as claimed in claim 18, wherein a second surface tension sealing means is provided at an end of the gap between the shaft and the shaft retainer.

20. A motor as claimed in claim 18, wherein said communication hole opens at the first surface tension sealing means.

21. A motor as claimed in claim 18, wherein the first surface tension sealing means includes an inclined surface formed on the shaft retainer to form a tapered space at the end of the first gap.

* * * * *